(12) United States Patent
Sharma et al.

(10) Patent No.: US 12,197,459 B2
(45) Date of Patent: Jan. 14, 2025

(54) SYSTEM AND METHOD FOR CLOUD-BASED INTELLIGENCE ANALYSIS AND VISUALIZATION GENERATION

(71) Applicant: Accenture Global Solutions Limited, Dublin (IE)

(72) Inventors: Sanjay Sharma, New Delhi (IN); Reema Malhotra, New Delhi (IN); Prachi Rajesh Sawant, Mumbai (IN); Jain Abhishek Kumar, Kota (IN); Abhinav Kumar, Noida (IN); Gaurav Yadav, Gurugram (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 47 days.

(21) Appl. No.: 18/334,595

(22) Filed: Jun. 14, 2023

(65) Prior Publication Data

US 2024/0419678 A1    Dec. 19, 2024

(51) Int. Cl.
*G06F 16/25* (2019.01)
*G06F 16/22* (2019.01)
*G06F 16/26* (2019.01)

(52) U.S. Cl.
CPC ........ *G06F 16/254* (2019.01); *G06F 16/2282* (2019.01); *G06F 16/256* (2019.01); *G06F 16/258* (2019.01); *G06F 16/26* (2019.01)

(58) Field of Classification Search
CPC .. G06F 16/254; G06F 16/2282; G06F 16/256; G06F 16/258; G06F 16/26
See application file for complete search history.

(56) References Cited

U.S. PATENT DOCUMENTS

| | | | | |
|---|---|---|---|---|
| 2008/0288889 | A1* | 11/2008 | Hunt | G06Q 30/02 715/810 |
| 2014/0337429 | A1* | 11/2014 | Asenjo | H04L 67/10 709/204 |
| 2021/0258373 | A1* | 8/2021 | Syed | G06F 9/5077 |
| 2023/0283657 | A1* | 9/2023 | Syed | H04L 67/1008 709/226 |

OTHER PUBLICATIONS

Chunquan Li et al., "A review of industrial big data for decision making in intelligent manufacturing", Engineering Science and Technology, an International Journal 29, pp. 1-16 (Year: 2022).*

(Continued)

*Primary Examiner* — Jared M Bibbee
(74) *Attorney, Agent, or Firm* — Mannava & Kang, P.C.

(57) ABSTRACT

A data processing and analysis system that optimizes the resources to be used for data storage and refresh events. A partitioner module for a data analysis system can receive a first client criteria and a first client dataset that includes tabular data and calculate scores that are used to generate partitioning strategies. The selected partitioning strategy can be implemented to produce aggregated data that can be stored in an intelligent data mart. The partitions can then be accessed by a data visualization platform for intelligent, dynamic responses to user requests for data analyses and generation of visualizations. By providing synchronous partitioning of data (especially big data) and intelligent refresh, the data can move from the back-end to the front-end with minimal user clicks and minimal latency in performance.

20 Claims, 9 Drawing Sheets

(56) References Cited

OTHER PUBLICATIONS

Uthayasankar Sivarajah et al., "Critical analysis of Big Data challenges and analytical methods", Journal of Business Research 70, pp. 1-24 (Year: 2017).*

Priya et al., "Big Data, Cloud and IoT: An Assimilation", Second International Conference on Advances in Computing, Control and Communication Technology, pp. 34-40 (Year: 2018).*

Radford et al., "Language Models Are Unsupervised Multitask Learners", Computer Science, published 2019.

* cited by examiner

SYSTEM AND METHOD FOR CLOUD-BASED INTELLIGENCE ANALYSIS AND VISUALIZATION GENERATION

TECHNICAL FIELD

The present disclosure generally relates to the analysis of complex data in the cloud, and more particularly to efficient and intelligent partitioning of large amounts of data and generation of real-time visualization insights.

BACKGROUND

Data analytics is an increasingly growing field that draws insights from raw information sources. The techniques for data analytics may vary, but they are typically used to collect, process, and analyze data for human consumption and decision-making purposes. Data analytics may be used to reveal trends and metrics that would otherwise be lost or "invisible" due to large quantities of unanalyzed data. Using this information in this way, however, may optimize processes and increase overall efficiencies in systems that would not otherwise be obtained.

Traditionally, many visualization dashboards have primarily focused on providing high-level summaries, such as segment profiling, cohort analysis, and other similar metrics. To gain a competitive advantage, stakeholders including line managers seek tools to uncover deeper analytical insights by drilling down into lower-level data available the reports. Yet in the context of 'big data' (with trillions of tabular rows and massive amounts of memory), visualization report generation becomes riddled with lagging, particularly in response to front-end refresh requests. This results in undesirably high-latency dashboards and impeded access to essential insights.

There is a need in the art for a system and method that addresses the shortcomings discussed above.

SUMMARY

A data processing and analysis system that optimizes the resources to be used for data storage and refresh events is disclosed. The proposed systems and methods describe a dynamic and automated process for generating partitioning strategies for implementation with big data managed and maintained in the cloud. The system and method solve the problems discussed above by automatically scoring and identifying the optimal partition size that is best suited to the user requirements for a given project. In one example, data from multiple sources can be integrated in a cloud-agnostic and data formatting-agnostic process, allowing the system to create new metrics and establish a set of relationships that support construction of a tabular semantic data model that powers the visualization tool. In some embodiments, the proposed data analysis framework employs a highly optimized and automated partition loading technique which involves dividing the data into smaller units. In addition, a custom data refresh technique that selectively refreshes only the necessary partitions along with intelligent data mart capability provides a significant reduction in required computational time as redundancies are removed.

In one aspect, the disclosure provides a computer-implemented method of processing and partitioning data for a cloud computing-based infrastructure. The method includes a first step of receiving, at a partitioner module for a data analysis system, a first client criteria and a first client dataset that includes tabular data, and a second step of calculating, at the partitioner module, a first size score for the tabular data, the first size score identifying a first data increment that is most likely to meet the first client criteria. In addition, a third step includes generating, at the partitioner module, a first partitioning strategy based on the first size score, and a fourth step includes implementing, at the data analysis system, the first partitioning strategy to produce sets of aggregated data in the tabular data, the sets including a first partition. A fifth step of the method includes storing the sets of aggregated data as part of an intelligent data mart in the data analysis system. A sixth step includes receiving, via a first user interface associated with a data visualization platform, a first user query, and a seventh step includes determining the first user query is related to the first partition. Furthermore, the method includes an eighth step of retrieving, via the data visualization platform, the first partition from the intelligent data mart, and a ninth step of generating, for the data visualization platform and via a generative artificial intelligence (AI) module, a first visualization based on the first partition In another aspect, the disclosure provides a non-transitory computer-readable medium storing software comprising instructions executable by one or more computers which, upon such execution, cause the one or more computers to process and partition data for a cloud computing-based infrastructure by performing the following: (1) receiving, at a partitioner module for a data analysis system, a first client criteria and a first client dataset that includes tabular data; (2) calculating, at the partitioner module, a first size score for the tabular data, the first size score identifying a first data increment that is most likely to meet the first client criteria; (3) generating, at the partitioner module, a first partitioning strategy based on the first size score; (4) implementing, at the data analysis system, the first partitioning strategy to produce sets of aggregated data in the tabular data, the sets including a first partition; (5) storing the sets of aggregated data as part of an intelligent data mart in the data analysis system; (6) receiving, via a first user interface associated with a data visualization platform, a first user query; (7) determining the first user query is related to the first partition; (8) retrieving, via the data visualization platform, the first partition from the intelligent data mart; and (9) generating, for the data visualization platform and via a generative artificial intelligence (AI) module, a first visualization based on the first partition.

In yet another aspect, the disclosure provides a system for generating an application architecture for a cloud computing-based infrastructure, the system comprising one or more computers and one or more storage devices storing instructions that may be operable, when executed by the one or more computers, to cause the one or more computers to: (1) receive, at a partitioner module for a data analysis system, a first client criteria and a first client dataset that includes tabular data; (2) calculate, at the partitioner module, a first size score for the tabular data, the first size score identifying a first data increment that is most likely to meet the first client criteria; (3) generate, at the partitioner module, a first partitioning strategy based on the first size score; (4) implement, at the data analysis system, the first partitioning strategy to produce sets of aggregated data in the tabular data, the sets including a first partition; (5) store the sets of aggregated data as part of an intelligent data mart in the data analysis system; (6) receive, via a first user interface associated with a data visualization platform, a first user query; (7) determine the first user query is related to the first partition; (8) retrieve, via the data visualization platform, the first partition from the intelligent data mart; and (9) generate, for the data visualization platform and via a generative artificial intelligence (AI) module, a first visualization based on the first partition.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
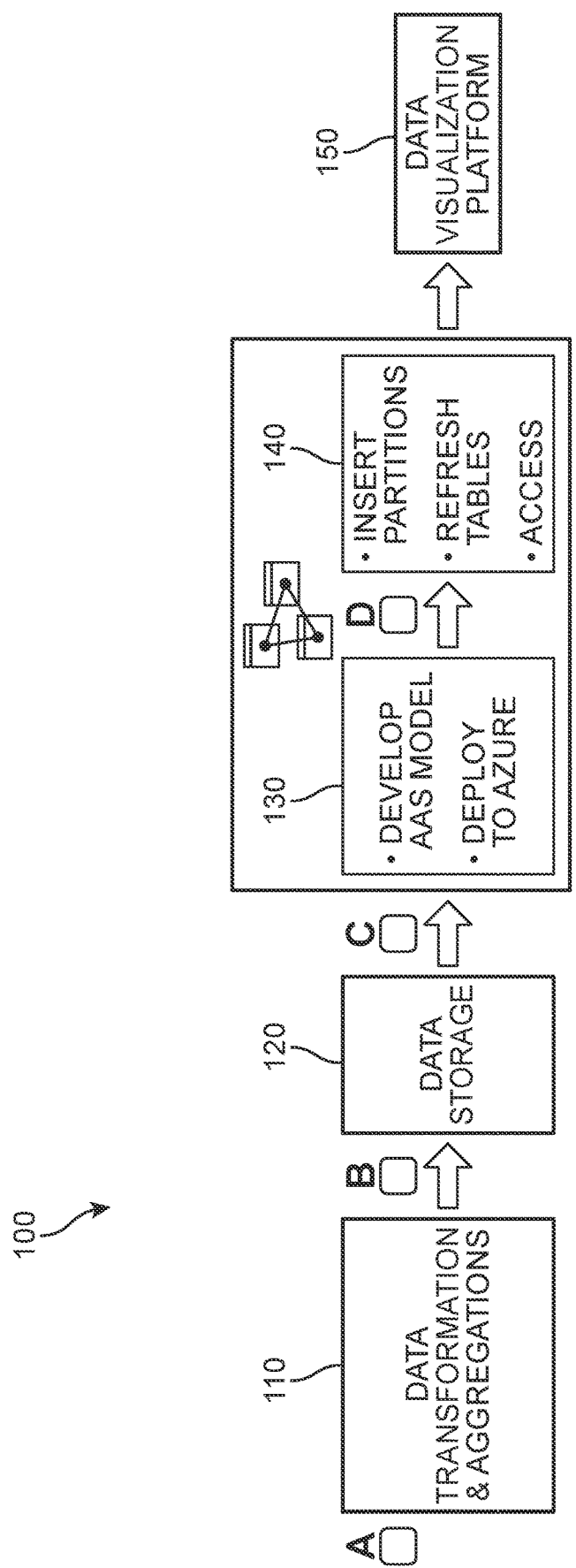
FIG. 1 is an overview of an embodiment of a process for intelligent data partitioning and analysis.

Visualization dashboards are an integral component of data analytics, particularly when processing large amounts of data. In general, dashboards present information in a high-level summary of persistent aggregated smaller size data, offering a quick overview of key insights. Yet for a dashboard to offer the greatest utility, it must allow for insights that accommodate both the larger scope 'big picture' of the data as well as the nuances that can only be detected at the granular level. Because the design and production of conventional visualization dashboards rely on summarized data, it has remained challenging to conduct detailed analysis and explore granular models based on the summarized data. For example, conventional front-end dashboards are not equipped to allow a user to drill down into the data, and can only generate superficial analytical insights. In addition, such dashboards are unable to ingest data on the large scale that is becoming more common. As traditional visualization and reporting tools attempt to process big data in response to front-end refresh operations, there remain frequent lags. Furthermore, sensitive customer data such as Personal Identifiable Information (PII) or Protected Health Information (PHI) cannot be ingested without the risk of exposure as the data must be fed into a reporting tool through either an import mode or a direct query mode.

Despite this context, nearly every layer of business decision-making is increasingly expected to be backed by data and, in some cases, artificial intelligence (AI) driven insights. There is a strong need for a codeless approach to data analysis and visualization dashboard generation that offers data security and empower users to perform efficient analysis without relying on coding expertise that can unlock valuable data-driven insights that would otherwise be lost in a massive data store.

The proposed systems and methods are directed to the automated, intelligent curation of data from a granular level to generate a comprehensive, high-level, quality dashboard that can leverage enterprise-level data models hosted in the cloud. As will be discussed in greater detail below, the embodiments can create an intelligent data mart that holds the most relevant information at the desired level of granularity, and is organized at different aggregation levels. Data from multiple sources can be integrated in a cloud-agnostic and data formatting-agnostic process, allowing the system to create new metrics and establish a set of relationships that support construction of a tabular semantic data model that powers the visualization tool. In one example, the proposed analytic framework employs a highly optimized and automated partition loading technique which involves dividing the data into smaller units. In addition, a custom data refresh technique that selectively refreshes only the necessary partitions along with intelligent data mart capability provides a significant reduction in required computational time as redundancies are removed. In some embodiments, the system can strategically ingest big data using a custom enterprise data model that intelligently divides data into smaller unit and enables a scheduled custom automated refresh without impacting data granularity and data quality. This approach has been shown to provide faster processing speeds and offers secure data integration. Furthermore, such a granular-level data analysis enables business to perform tooltip analysis without relying on coding expertise, allowing for an effective and efficient self-service tool for end-users. A significantly reduced turnaround time for the requested insights enhance the usability of the dashboard, and provides end-users with insights derived from the most up-to-date data, fostering timely informed decisions. In addition, some embodiments can incorporate generative artificial intelligence (AI) techniques in producing the dashboard to further reduce (compress) backend data size and processing complexities.

For purposes of introduction, one non-limiting example of an implementation of the proposed data analysis visualization system ("system") is depicted in FIG. 1. In different embodiments, a client may desire data stored in their cloud-based system, such as a cloud-based Extract, Transform and Load (ETL) and data integration service enterprise ("data integration enterprise"), be leveraged and prepared for analysis using the proposed embodiments. In FIG. 1, data can be moved through and refreshed by the data integration enterprise 100 along an automated pipeline to a data modeler such as a platform as a service (PaaS) that provides enterprise-grade data models in the cloud. The proposed system can thereby be integrated into the already existing data integration enterprise 100, such as but not limited to Azure Data Factory®, AWS Glue®, IBM InfoSphere DataStage®, Matillion ETL®, Apache NiFi®, Talend Big Data Platform®, Pentaho Data Integration®, SnapLogic Intelligent Integration Platform (IIP)®, MuleSoft Anypoint Platform®, etc.

For example, as data is received into the data integration enterprise 100, the system performs an initial assessment of data size and velocity at stage A. A first module 110 performs data transformation and aggregations on the received data, and produces a first output including a finalized design for the data mart in a stage B. First module 110 can include, for example, tools for building, deploying, sharing, and maintaining enterprise-grade data solutions at scale, such as but not limited to Databricks®, MongoDB Atlas®, Oracle Database®, Amazon Redshift®, Spark®, Domino®, Confluent®, Amazon EMR®, Db2®, DataStax Enterprise®, Redis Enterprise Cloud®, CDP Data Hub®, Couchbase Server®, etc.

In some embodiments, the finalized design is outputted as one or more CSV files. A second module 120 for data storage receives and stores the first output and also initiates a process of synchronous partitions creation in a tabular model to produce a second output (stage C) that is shared with the client's PaaS 160. In different embodiments, the second module 120 can include a cloud-based repository for both structured and unstructured data, such as but not limited to Azure Data Lake Storage Gen2®, Oracle Database®, Amazon Redshift®, Db2®, CDP Data Hub®, Databricks Lakehouse Platform®, EDB Postgres Advanced Server®, etc.

The PaaS can further incorporate a third module 130 and a fourth module 140. In this case, the second output is received by the third module 130 which uses the data to develop a model for the PaaS and can deploy the model to the cloud. In different embodiments, the third module 130 can include a development environment or code editor tool that can be used to create websites, web applications, web services, and mobile applications, such as but not limited to Microsoft Visual Studio®, Xcode®, Eclipse®, NetBeans®, Android Studio®, Qt®, Firebase®, IntelliJ IDEA®, OutSystems®, etc.

In addition, at stage D, a process of intelligent refresh of partitions using data orchestrators is performed on the data, producing a third output that is shared with the fourth module 140. In different embodiments, the fourth module 140 can include a software application for configuring, managing, and administering instances of the SQL server, such as but not limited to Microsoft SQL Server Management Studio®, MySQL WorkBench®, Teradata Vantage®, Oracle Database®, Amazon Relational Database Service (RDS)®, Db2®, PostgreSQL®, SAP HANA Cloud®, Toad For Oracle®, etc. in some embodiments, the intelligent refresh is based on the client's requested refresh frequency. Thus, during the initial design of the system, the client can indicate what frequency or time interval a data refresh and partition update should occur, and this preference will be implemented into the system to enable automatic refreshes occur to match the client's preference. In still other cases, the client can indicate their preference for a first refresh rate (e.g., weekly refresh) for one type of data report, and a different refresh rate (e.g., monthly refresh) for another type of data report, and the system can create two different types of data tables in the intelligent data that work at the different refresh cycle rates. In cases where the partitions are determined by the system to be too heavy or bulky at the client's desired refresh rate (based on an internal partition scoring mechanism), the system can automatically shift the refresh rate to a lower level (more frequent refresh rate) to ensure a partition score that allows for data analysis to occur without latency. Thus, in some embodiments, the fourth module 140 can inserts partitions, refresh the tables, and enables access to the data for a selected platform for self-service and enterprise business intelligence (BI) and data visualization, shown here as a fifth module 150 which can be used to generate key insights based on the data. In different embodiments, the fifth module 150 can include tools to collate, manage, and analyze data from a variety of sources, such as PowerBI®, Datapad®, Tableau Desktop®, Sisense®, QlikSense®, Zoho Analytics®, Cyfe®, Holistics®, Ubiq®, and IMP Cognos Dashboard®, etc.

Figure 2:
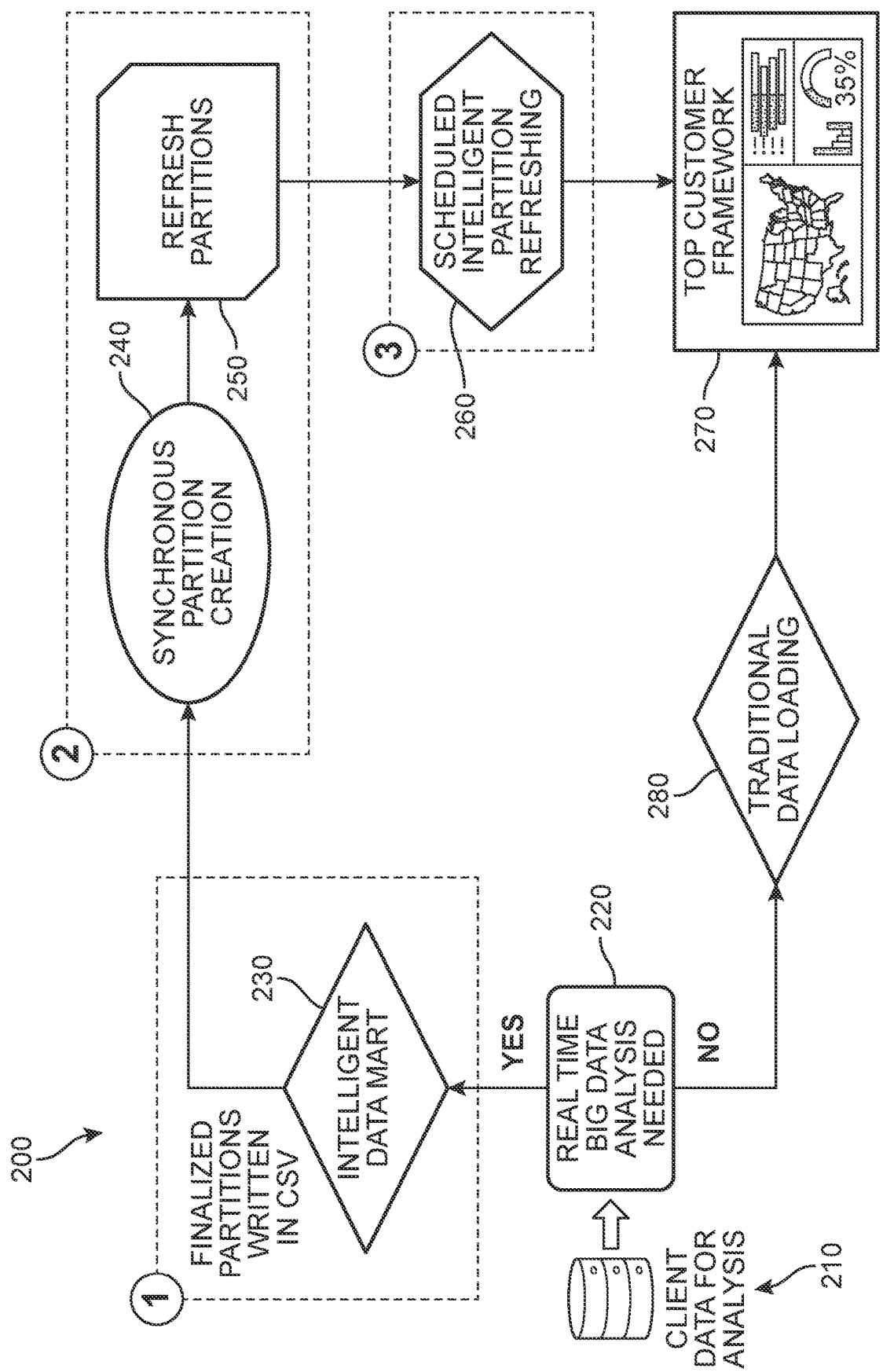
FIG. 2 is a high-level view of a data analysis system, according to an embodiment.

Moving now to FIG. 2, an embodiment of an architecture of a proposed data analysis system 200 is illustrated to provide context to the reader. Architecture 200 can be understood to provide a simplified flow through high-level key components of the system. Initially, client data 210 that is to be analyzed is received, and a first decision 220 is made with respect to the client 210 to determine whether the proposed system should be implemented for analysis. If the data does not require a real-time analysis nor is it computationally large (big data), traditional data loading techniques can be used to generate a visualization dashboard 270 that sufficiently covers the client's needs. However, if a real-time big data analysis is required by the client, the client data 210 can be moved into a first stage of the system in which an intelligent data mart module 230 begins processing the client data 210 and produces CSV-based finalized partitions. The operation of the intelligent data mart module 230 will be discussed further below with reference to FIGS. 3, 4, and 5.

The output of the intelligent data mart module 230 is then passed to a synchronous partition creation module 240 that applies an optimized partition strategy to the data using logical sequence partitioning. As a general matter, partitions divide a table into logical parts. Partitions work by dividing a table into logical partition objects. Individual partitions, each containing a unique segment of data, can then be incrementally processed either sequentially or in parallel independent of other partitions, or excluded from processing operations altogether. Partitions therefore divide portions of data that need to be processed (refreshed) frequently from data that can be processed less frequently. In other words, each partition can then be processed (refreshed) independent of other partitions. In many cases, such as with tabular data, dividing a table's single partition into multiple partitions can better utilize available resources for processing. As will be described herein, the proposed systems enable effective model design and processing strategy that utilizes partitions to eliminate unnecessary processor load and memory consumption, while at the same time making certain that data is refreshed often enough to reflect the most recent data from data sources. Partitions defined for a model during model authoring are duplicated in a deployed model.

In some embodiments, the partitioned data can then be passed to a refresh partitions module 250, which employs data orchestration to refresh each partition. The refreshed partitions can be provided to a scheduled refresh module 260, which ensures that the partitions are maintained at their designated refresh rate (per the client's request). Thus, the scheduled refresh module 260 can automatically cause the partitions to refresh at the specified schedule for each dataflow. This up-to-date data is then used by the system to generate the desired visualization dashboard 270. The visualization dashboard 270 can be updated based on the synchronized partitions that reduce the amount of data that needs to be searched by intelligent filtering that only searches the data units (partitions) that the desired insights are related to. In addition, the refresh can also be more efficient as only the pertinent partitions need be refreshed out of the larger set of data, reducing processing time. In different embodiments, the visualization dashboard 270 provides end-users the ability to create self-service enabled visuals based on granular data using unique prompt commands, in some cases by incorporating generative AI to create the custom visual presentations.

It should be appreciated that the creation of and availability of the system's intelligent data mart enables a unique functionality of partitioning big data into multi-dimensional data units automatically at multiple levels. The intelligent data mart thereby empowers a seamless connection of data from the data warehouse layer to the visualization layer. In some embodiments, the system utilizes the creation of the tabular model at the back-end by building a logical sequence of partitions which in-turn helps facilitate the synchronous scheduled refresh events at the partition level. Such an approach can ensure that the system is not required to refer to big data tables when a user query is created through the front-end-instead, the data is already broken into smaller units at the back-end (through innovative partitioning within intelligent data mart) which enables a buffer-less retrieval process and a significantly more rapid response time on the generation of visualizations.

Figure 3:
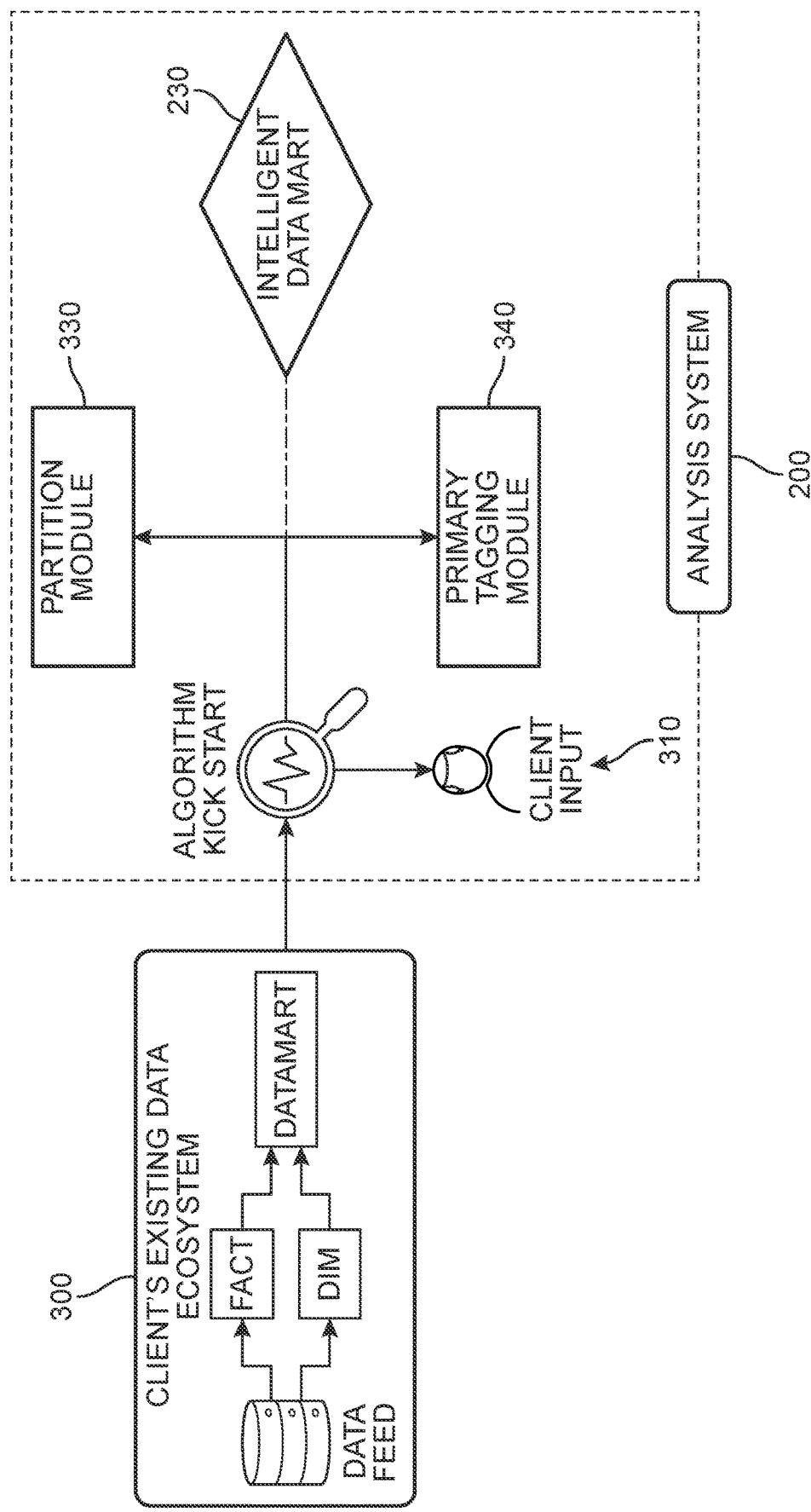
FIG. 3 is a schematic diagram depicting features of an intelligent data mart for the data analysis system, according to an embodiment.
Figure 4:
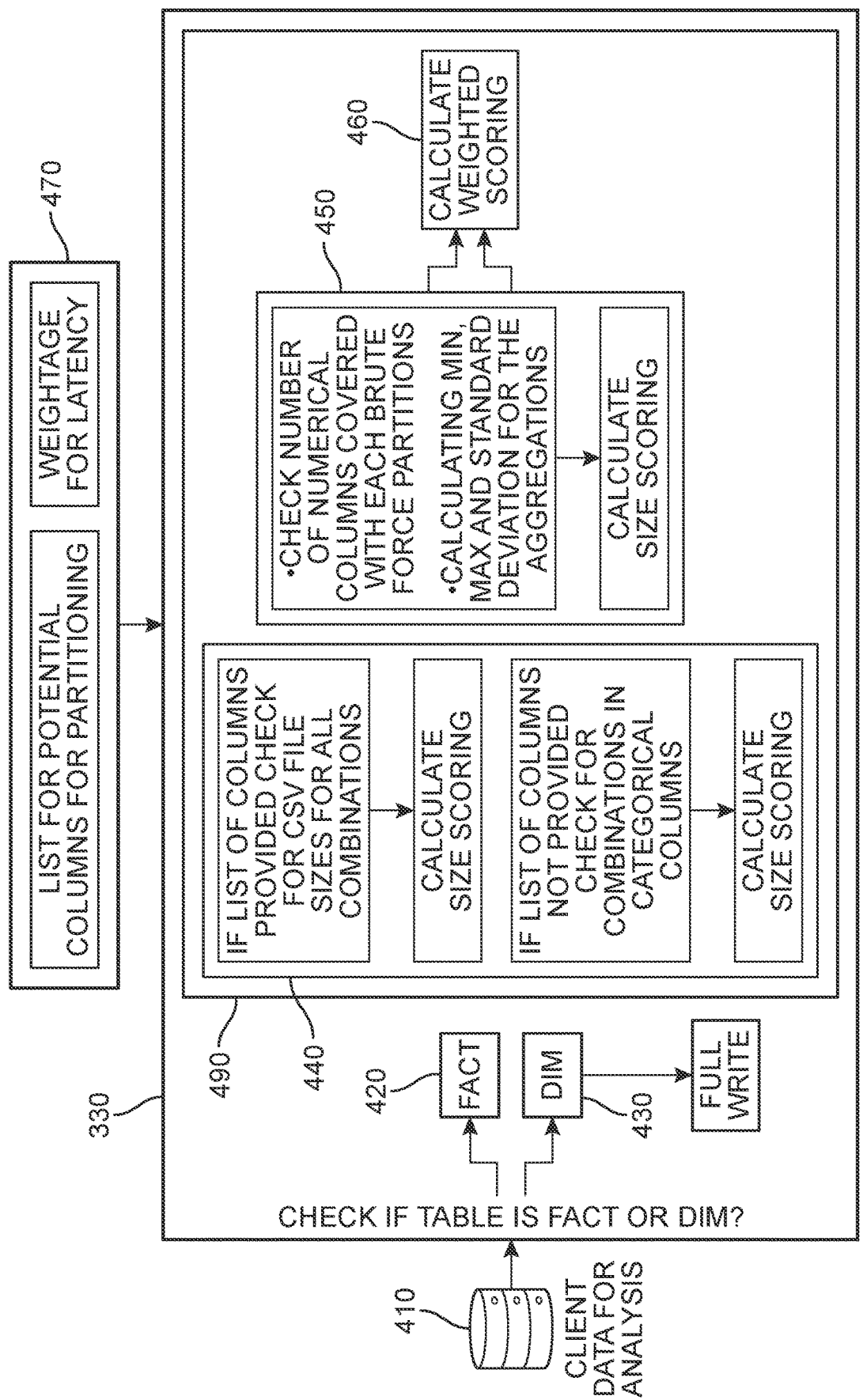
FIG. 4 is a schematic diagram depicting a scoring process for a partitioner module of the data analysis system, according to an embodiment.
Figure 5:
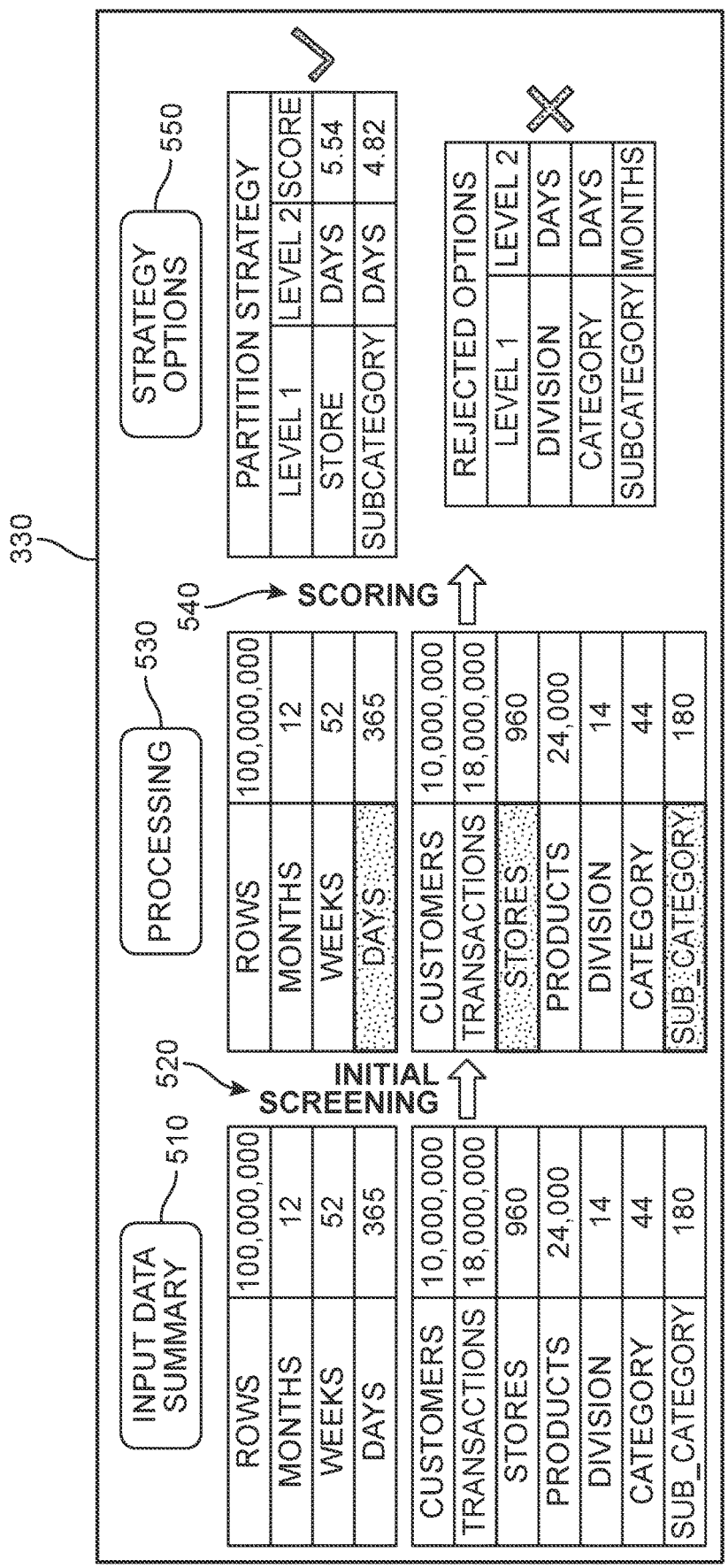
FIG. 5 presents some examples of partitioning strategy generation that can be produced by the partitioner module, according to an embodiment.

Referring now to FIGS. 3, 4, and 5, additional details regarding the features of the analysis performed by the intelligent data mart module 230 are provided. In FIG. 3, the integration of the intelligent data mart module 230 with an example of a client's existing data ecosystem ("existing data") 300 is shown. In different embodiments, the existing data 300 can include a client's existing semantic layer of data. In one example, such existing data 300 could reside in legacy systems or cloud data lakes with a conventionally consistent refresh mechanism, and with or without data mesh architecture. It should be appreciated that the proposed data analysis systems do not require any specific format or template for the client ecosystem, as it can be readily connected or integrated across a wide variety of existing semantic data sources (e.g., the system is format-agnostic).

In some embodiments, existing data 300 can include a semantic layer with multiple dimensions and tables that can be fed into a standard data mart. As a general matter, a data mart refers to a subject-oriented database that is often a partitioned segment of an enterprise data warehouse. The subset of data held in a data mart typically aligns with a particular unit like manufacturing, sales, etc. Data marts can accelerate processes by allowing access to relevant information in a data warehouse within a shorter time and hence form a cost-effective way to gain actionable insights quickly. Transferring data from the source database(s) to one or more destination database(s)/data warehouse(s) can involve an Extract Transform Load (ETL) process which takes care of each movement and processing of data to load the data in an integrated form to the destination database/data warehouse.

In one example, the existing data 300 can be received into an initial processing ecosystem 390 of the larger data analysis system 200. At a first stage 310, a machine learning algorithm facilitates the collection of additional client input that will be used in part to determine how the data will be organized. In some embodiments, a client can describe how frequently/often they wish to view refreshed (updated) data, for example at a monthly level, weekly level, daily level, etc. In one embodiment, the client can select a refresh rate for each level of data. Thus, the client input will be used to determine a desired level granularity for details like recency: monthly, weekly, daily, hourly etc., along with other features required in reports The existing data 300 and pertinent client inputs are then passed to two separate modules, including a partitioner module 330 and a primary tagging module 340, which can automatically prepare the data for building the intelligent data mart. In one example, the partitioner module 330 and primary tagging module 340 serve as tools that ingest the client data and generates a summary of various features or items in the data such as the count of unique values and/or multiple columns (e.g., distinctcount in Microsoft PowerBI®, etc.) and a primary key analysis to identify the column or columns in a table that are qualified and suitable to be the primary key of the table, detailing the feasible partition options.

In some embodiments, the partitioner module 330 includes an algorithm that is configured to propose one or more partitioning strategies, across multiple levels of data, based on client inputs and the data's veracity. From these proposed strategies, the client can choose the one that suits their needs, or this selection can be made automatically based on the preferences indicated in the client input. Moving to FIG. 4, additional details regarding the operation of the partitioner module 330 are discussed. In general, client data 410 (e.g., existing data 300 of FIG. 3) can be received by the partitioner module 330 and diverted along two paths based on the type of tables involved. Thus, fact-based data 420 can be routed along a first path, while DIM-based data 430 can be routed along a second path.

As a general matter, fact-based data 420 comprises fact tables and DIM-based data 430 comprises dimension tables. For purposes of context for the reader, these two can be understood to represent key components of a schema in a data warehouse. A fact table contains records that combine attributes from different dimension tables. These records allow users to analyze different aspects of their business, which can aid in decision-making and improving the business. Dimension tables provide the context and background information for the measures recorded in the fact table.

Thus, a difference between fact tables and dimension tables is that dimension tables contain the attributes that the measures in the fact table are based on. In addition, when multiple fact tables are used, they can be organized using a "fact constellation schema." A fact table typically has two types of columns: those that contain the facts and those that serve as foreign keys linking to dimension tables. What is referred to as the primary key of a fact table is often a composite key made up of all of the foreign keys in the table. Each fact table has a key that is made up of the primary keys from all of the dimension tables connected to that fact table. A concatenated key is one such key that specifically identifies the row of the fact table. Fact tables can hold various types of measurements, such as additive, non-additive, and partly additive measures, among others, and store important information in the data warehouse. Fact tables are therefore useful for evaluating dimensional attributes because they provide additive values that can act as independent variables. The granularity of a fact table is a common way to describe its layers. The grain of a fact table refers to the most basic level at which the facts can be defined. For example, the grain of a sales fact table might be "sales volume by day by-product by the shop," meaning that each entry in the table is uniquely identified by a day, product, and shop. In contrast, the term "dimension table" refers to a set of data related to any quantifiable event and is the foundation for dimensional modeling. Dimension tables have a column that serves as a primary key, allowing each dimension row or record to be uniquely identified. This key is used to link the dimension table to the fact tables. A surrogate key, which is a system-generated key, is often used to uniquely identify the rows in the dimension table.

In different embodiments, for the purposes of the partitioner module 330, only fact-based data 420 is used to generate a weighted score. As shown in FIG. 4, the fact-based data 420, along with designated preferences 470 (e.g., list identifying potential columns for partitioning, and a weightage for latency) are ingested by a scoring submodule 490. In a first stage 440, a first size score is calculated. If there is a list of columns provided, the size score is calculated by checking for the CSV file sizes for all combinations. If a list of columns is not provided, the first size score is calculated by checking for the combinations in the categorical columns. In a second stage 450, a second size score is calculated by checking the number of numerical columns covered with each of a set of brute force-created partitions, and then further calculating a Min, Max, and Standard Deviation for the Aggregations. These scores collectively will be used to generate a weighted partitioner score 460 that can be used to assess the partition strategies. In other words, the partitioner module 330 can determine all of the possible combinations for primary keys, sequencing columns, etc. and, based on these combinations, calculate a sequence set for data of varying lengths across all of the different combinations and assign a scoring for each sequence set. The client can choose whether to optimize with respect to storage size or synchronous loading based on the combination of columns with the highest score.

For purposes of clarity, a non-limiting example of the strategy options that can be generated via the partitioner module 330 is depicted in FIG. 5. As noted above, the partitioner module 330 can receive client data such as an input data summary 510. In this case, the input data summary 510 includes two tables that described the larger dataset. Following an initial screening 520 involving data diagnostic techniques, the system can identify all of the feasible partitions. In this example, the shaded boxes represent the categories of data that have been identified as the most feasible or optimal partitions based on the client's desired level of details. This screened data is then scored (e.g., see FIG. 4). The score is applied to the data to generate different multi-level partitions, each one representing a strategy that seeks to optimize the number of partitions and data in each partition.

In this example, partition strategies 560 show a first recommendation that includes a first option to partition at the store level, and a second option to partition at the day level. In a second recommendation, there is a first option to partition at the subcategory level, and a second option to partition at the day level. In different embodiments, additional levels can be included based on the client's preferences. In addition, in some embodiments, rejected options 570 can also be presented that were deemed not viable for the provided setup or cloud structure based on the calculated score. It should be understood that the final scoring and strategy options requires no manual intervention. In one embodiment, the partitioning strategy option with the highest score can then be identified as the top strategy that is most likely to provide the user with the desired granularity of data while maintaining efficiency. With these optimized partitioning strategy options based on the client's needs, the system can more readily develop and build an intelligent data mart.

As noted earlier in FIG. 3, along with the partitioner module 330, the existing data is also processed by primary tagging module 340. In general, the primary tagging module 340 implements an algorithm that generates scores based on multiple options suited for primary tagging at various levels, from which the user can select one and proceed, or the system can automatically select the top score and proceed. In different embodiments, the primary tagging module 340 can analyze the existing data and identify a client's primary tagging (or primary keys). Simply for purposes of illustration, one example of a process by which the primary tagging module 340 can be used to aggregate the data is shown below. In this example, a first set of data is received, represented by Table 1, for the store visits of two customers (a1 and a2) on different dates and their spend history.

TABLE 1

| Customer | Date | Store | Spend |
|---|---|---|---|
| a1 | Apr. 4, 2023 | s1 | 26 |
| a1 | Mar. 17, 2023 | s1 | 3 |
| a1 | Mar. 9, 2023 | s4 | 99 |
| a2 | Apr. 3, 2023 | s2 | 24 |
| a2 | Feb. 27, 2023 | s2 | 96 |
| a2 | Mar. 26, 2023 | s5 | 29 |

The primary tagging module 340 can apply a primary tag based on the customer's store, and output a new table (Table 2) that lists the same information but, in this case, the store data has changed to only identify the primary store for each customer (S1 for customer a1 and S2 for customer a2).

TABLE 2

| Customer | Date | Primary Store | Spend |
|---|---|---|---|
| a1 | Apr. 4, 2023 | S1 | 26 |
| a1 | Mar. 17, 2023 | S1 | 3 |
| a1 | Mar. 9, 2023 | S1 | 99 |
| a2 | Apr. 3, 2023 | S2 | 24 |
| a2 | Feb. 27, 2023 | S2 | 96 |
| a2 | Mar. 26, 2023 | S2 | 29 |

This table data can then be aggregated by the primary tagging module 340 by reference to the primary store to generate a third table (Table 3) that allows for a significant reduction in data size (in this case, approximately 40-50%).

TABLE 3

| Customer | Primary Store | Spend |
|---|---|---|
| a1 | S1 | 128 |
| a2 | S2 | 149 |

Thus, in different embodiments, the system's primary tagging feature enables the flexibility to perform quick aggregations at the visualization layer. The intelligent data mart that is then built is based on the outputs of both the partitioner module 330 and primary tagging module 340 and can thereby integrate data from a wide and varied range of big data sources (e.g., rows in the billions and trillions) to enable real-time insights at granular (e.g., the customer, store, zip code, etc.) level. The intelligent data mart that is developed also enables logical sequencing of partitions along with synchronous refresh on dynamic data that can fully support the dashboard or report layer, and data is distributed and classified across more levels. Furthermore, the intelligent data mart can be used to generate different types of reports with different levels of granularity while also enabling cell service functionality and ad hoc analysis. Thus, if a client wishes to redesign the parameters of their report, rather than returning to the original data, they can directly access the intelligent data mart and run a simple query to retrieve the desired insights because the intelligent data mart serves as the single source of truth that greatly simplifies all queries. The intelligent data mart can maintain and express the client's pre-existing data as well as continue to perform refreshes to ensure the data is up-to-date. In order to balance the desire for frequent refreshes with processing efficiency, the system can perform refreshes based on the data that has been aggregated using partitioner and primary tagging, such that the amount of data processed is reduced while most of the insights like all the key performance indicators (KPIs) remain intact and accurate. In some embodiments, an automated data refresh using the proposed system will only refresh (over-write and archive) the specific partition that has become outdated and replace it with the new partitioned data (rather than inefficiently refreshing all of the partitions whenever there is new incremental data loaded into the back-end).

In different embodiments, once the intelligent data mart has been built, the data analysis system can automatically begin the partitioning process based on the selected partition strategy that will allow the loading of client data into the partitions. As introduced earlier in FIG. 2, the data analysis system 200 can employ the synchronous partition creation module 240 and refresh partitions module 250 to create and maintain the logical sequence of partitions as a tabular model. For purposes of comparison and to better illustrate the effectiveness of the proposed systems, two tables are presented below. In Table 4, some features of a conventional manual partition creation approach for a dataset are identified, while in Table 5, features of a synchronous partition creation approach of the proposed systems for the same dataset are shown.

TABLE 4

Manual Partition Creation in SSMS

1 Partitions Loading Efforts
4 changes for each partition in a script.
Loading at script again in SSMS.
Then wait for partition to finish load and start with next partition.
Total clicks = 14 Clicks + Additional Strings
1(Open Editor) +
1(Copy Script) +
1(Download Script) +
2(Search Partition Name in Current Script) +
4(Find & Replace Names) +
1(Copy Script) +
4(Load Script in SSMS, Run & Save)
For 12 Months = 12 * 14 = 168 Clicks and Wait time
For 104 Partitions = 14 * 104 = 1456 Clicks and Wait Time
Average Time for One Partition Creation = ~3 Minutes
For 104 Partitions = 3 * 1456 = 4368 Minutes = ~72 Hours

TABLE 5

Synchronous Partition Creation

Figure 6:
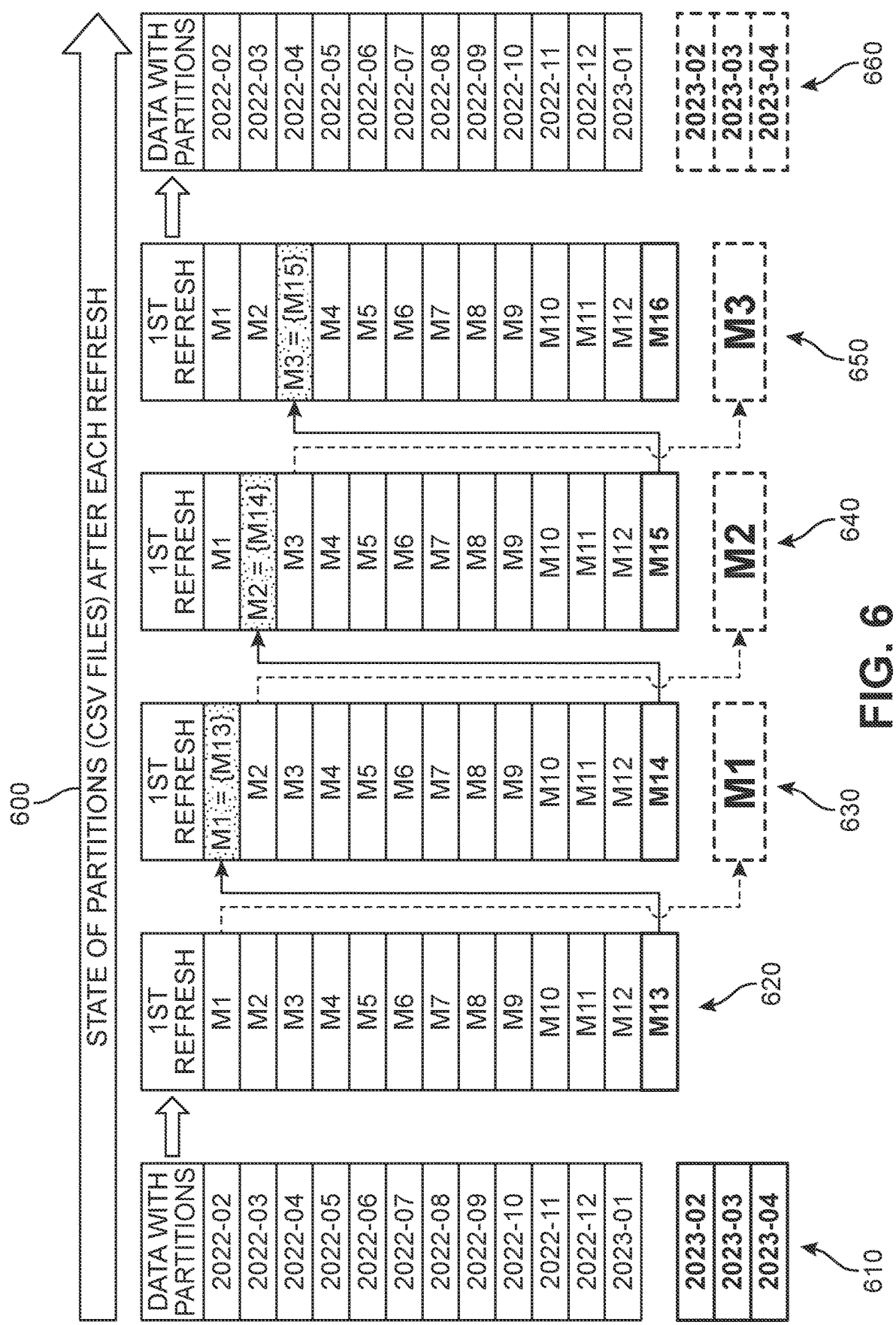
FIG. 6 is an example of a synchronous partitioning operation, according to an embodiment.

1 Partition Loading Efforts
Pass Blueprint to Automated Utility and
it will return complete Orchestrated Script for SSMS.
Total Clicks = 3 Clicks
1 (Copy Blueprint) +
1 (Pass Blueprint to Utility) +
1 (Load Script in SSMS)
For 12 Months = 3 Clicks
For 104 Partitions = 3 Clicks
Average Time for One Partition Creation = ~3 Minutes
For 104 Partitions = ~3 Minutes Thus, it can be appreciated that the synchronous partition creation framework in the back-end using tabular modeling based on the intelligent data mart can represent a vastly more efficient and simplified process that is far more user-friendly than conventional designs. Furthermore, as all partitions are being loaded synchronously, the proposed system is independent of the actual number of partitions that are selected, allowing for effective, intelligent management of a high number of partitions with multiple levels. In different embodiments, the data analysis system can then perform scheduled intelligent partition refreshing via the scheduled refresh module 260 (introduced in FIG. 2) to ensure the data in each partition is up-to-date. One simplified example of this approach for updating partitions 600 is depicted in FIG. 6. In this example, it can be understood that the partitions are in a logical sequence based on the outcome of the earlier modules and tightly interlinked with the tabular model.

In a first operation 610, an initial column is shown that represents data that has been partitioned by date (at the monthly level, from months February 2022 to January 2023). Below the column is a smaller column that reflects the updated data that needs to be incorporated into the existing data. As reference, these partitions will be labeled as M1, M2, M3, . . . . Mn, and the data within them will be labeled as {M1}, {M2}, {M3}, . . . {Mn}. In a second operation 620, the system performs a first refresh of the partitions. For purposes of simplicity, only 13 entries (M1-M13) are shown, but in other embodiments, this listing can be far greater in number. In the first refresh, there is an appending of an increment of the data (M13) to the existing list. However, rather than just adding on the new data, the system will also replace the older partitions to save memory. In this case, there is a new partition M13 of data {M13} that is brought into the set, which the system will use to automatically replace the oldest previous data. Thus, with a second refresh at third operation 630, the data {M13} has been inserted and overwritten the original {M1} data, so that M1 now contains {M13}. Furthermore, the older data {M1} is removed and archived (represented by the isolated M1 cell below the column), thereby optimizing storage, lowering costs, and reducing data leaks. In addition, the archival process ensures there is a back-up of data that accommodates system faults (i.e., maintaining a second version of history) that can be used to restore the model if needed. In some embodiments, the system's algorithm manages the history and decides which partition needs to be updated In other words, a swap can occur, in which new data content replaces the old data content, but only for that specific partition. At the same time, the next updated dataset (M14) can be moved into the cycle. This approach accommodates the unchanging nature of partition name and partition counts that cannot be modified once a tabular model is deployed. In a fourth operation 640, the system moves from a second refresh to a third refresh. In this example, the current M1 data (i.e., that is now comprises of {M13}) remains intact and is considered up-to-date. Instead, the new data for M14 that was appended in the previous stage is now transposed with the data held by M2. In other words, {M2} is replaced by {M14}. At the same time, the next updated dataset (M15) can be moved into the cycle, while the original data for M2 is archived.

In a fifth operation 650, a fourth refresh is performed. In this case, the current M2 data (i.e., that is now comprises of {M14}) remains intact and is considered up-to-date. Instead, the new data for M15 that was appended in the previous stage is now transposed with the data held by M3. In other words, {M3} is replaced by {M15}. At the same time, the next updated dataset (M16) can be moved into the cycle, while the original data for M3 is archived. This process is summarized in a sixth operation 660, where essentially the same column from the first operation 610 is presented but the contents for the first three partitions have been updated, while the original data for those three partitions has been securely archived.

Although the operations in FIG. 6 are presented in a sequence for purposes of reader clarity, it should be understood that in different embodiments, in the context of the system itself, these operations can occur in a substantially synchronous manner ("synchronous refresh"). This approach is in sharp contrast to more time-consuming and human error-prone conventional data refresh mechanisms which rely on a step-by-step sequency to move data from the data warehouse to the visualization layer by a series of steps of writing and partitioning data at manually defined intervals. The proposed embodiments incorporation of synchronous refresh enables a faster, error-free execution process to refresh massive amounts of data, for example by automating movement (with every required refresh) of data between layers (and at each of the levels of the partitions) and automating the addition of new data when it arrives. In other words, the proposed system adopts a partition refresh technique that significantly reduces the computing time required to maintain an up-to-date resource at the granular level. In one example, as the system moves the new data from the data warehouse layer to the visualization layer upon every refresh cycle (e.g., every new week as requested by the user's selected partition strategy) through an intermediate tabular model tool, the system can replicate the individual partition (e.g., the $104^{th}$ partition layer) created and maintained in the corresponding intelligent data mart on the tabular model. The system's highly efficient synchronous refresh tool automates the entire process and moves data across all of the partition layers (e.g., 103 partition layers), to add new data to the $104^{th}$ partition layer. Such an automated approach—with a reduced error rate—has conventionally not been feasible with big data.

Figure 7:
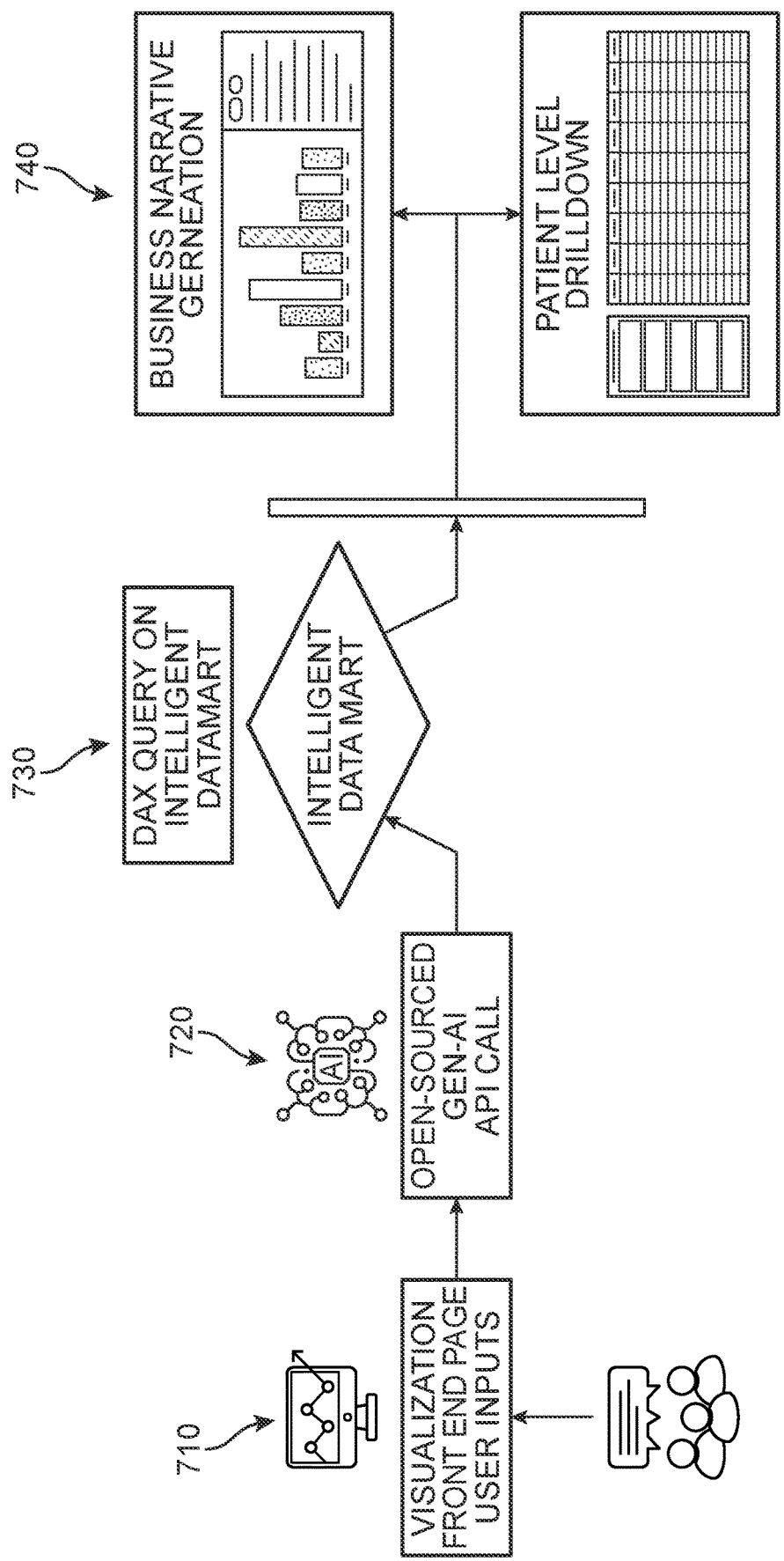
FIG. 7 is a schematic flow diagram depicting a method of generating visualizations for a user dashboard, according to an embodiment.

As noted earlier, in different embodiments, the proposed system can employ generative AI techniques to produce visualizations of the aggregated data stored in the intelligent data mart. In some embodiments, the generative AI is configured to filter data based on a query and automatically generate insights pertinent to the query. Thus, by providing the generative AI with the intelligent data mart as its source, in which the information is highly organized, the visualization can be rapidly developed to provide insights that are representative of the most up-to-date information available. For example, in FIG. 7, a user may access the front-end of the system via a data analytics dashboard in a first operation 710 and submit a request for understanding specific aspects/features of the data. In a second operation 720, the system calls the generative AI, which in response—in a third operation 730—queries the intelligent data mart. Based on the available data, various visualizations can then be automatically generated.

In some embodiments, the generative AI may include a transformer-based deep learning neural network architecture. For example, the domain specific language model may include an autoregressive language model (e.g., a generative pre-trained transformer (GPT) language prediction model) that uses deep learning to produce text in response to a query (e.g., to produce an answer to a question and/or to produce a reply to a comment, among other examples). In some embodiments, the visualizations may be generated by passing the data to a machine learning model, such as Generative Pre-trained Transformer (GPT), which is an open-source artificial intelligence created by OpenAI (see posting of Alec Radford et al. to https://OpenAI.com/blog (2023), including *Language Models are Unsupervised Multitask Learners*, incorporated by reference in its entirety). In some embodiments, the machine learning model can be trained in a dataset, such as the Paraphrase Adversaries from Word Scrambling (PAWS) dataset.

Figure 8:
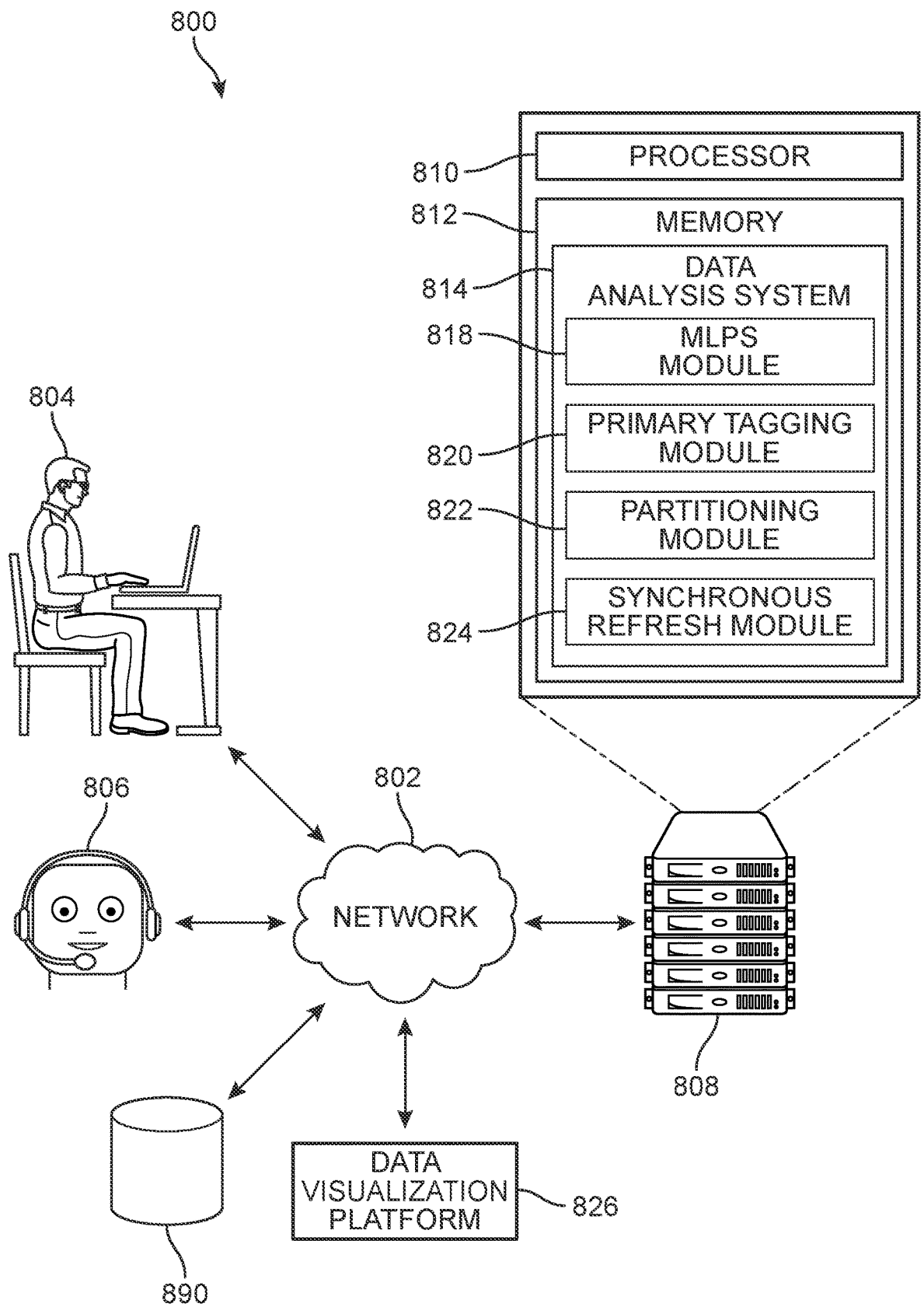
FIG. 8 is a diagram depicting example environments and components by which systems and/or methods, described herein, may be implemented.

FIG. 8 is a schematic diagram of an environment 800 for an intelligent data analysis system 814 (or system 814), according to an embodiment. The environment 800 may include a plurality of components capable of performing the disclosed methods. For example, environment 800 includes a user device 804, a computing/server system 808, a data visualization platform 826, and a database 890 which can include the intelligent data mart. The components of environment 800 can communicate with each other through a network 802. For example, user device 804 may retrieve information from database 890 via network 802. In some embodiments, network 802 may be a wide area network ("WAN"), e.g., the Internet. In other embodiments, network 806 may be a local area network ("LAN").

As shown in FIG. 8, components of the system 814 may be hosted in computing system 808, which may have a memory 812 and a processor 810. Processor 810 may include a single device processor located on a single device, or it may include multiple device processors located on one or more physical devices. Memory 812 may include any type of storage, which may be physically located on one physical device, or on multiple physical devices. In some cases, computing system 808 may comprise one or more servers that are used to host the system.

While FIG. 8 shows one user device, it is understood that one or more user devices may be used. For example, in some embodiments, the system may include two or three user devices. In some embodiments, the user device may be a computing device used by a user. For example, user device 804 may include a smartphone or a tablet computer. In other examples, user device 804 may include a laptop computer, a desktop computer, and/or another type of computing device. The user devices may be used for inputting, processing, and displaying information. Referring to FIG. 8, environment 800 may further include database 890, which stores processed partitioned data. This data may be retrieved by other components for system 814. As discussed above, system 814 may include a partitioner module 818, a primary tagging module 820, a partitioning module 822, and a synchronous refresh module 824. Each of these modules/components may be used to perform the operations described herein.

Figure 9:
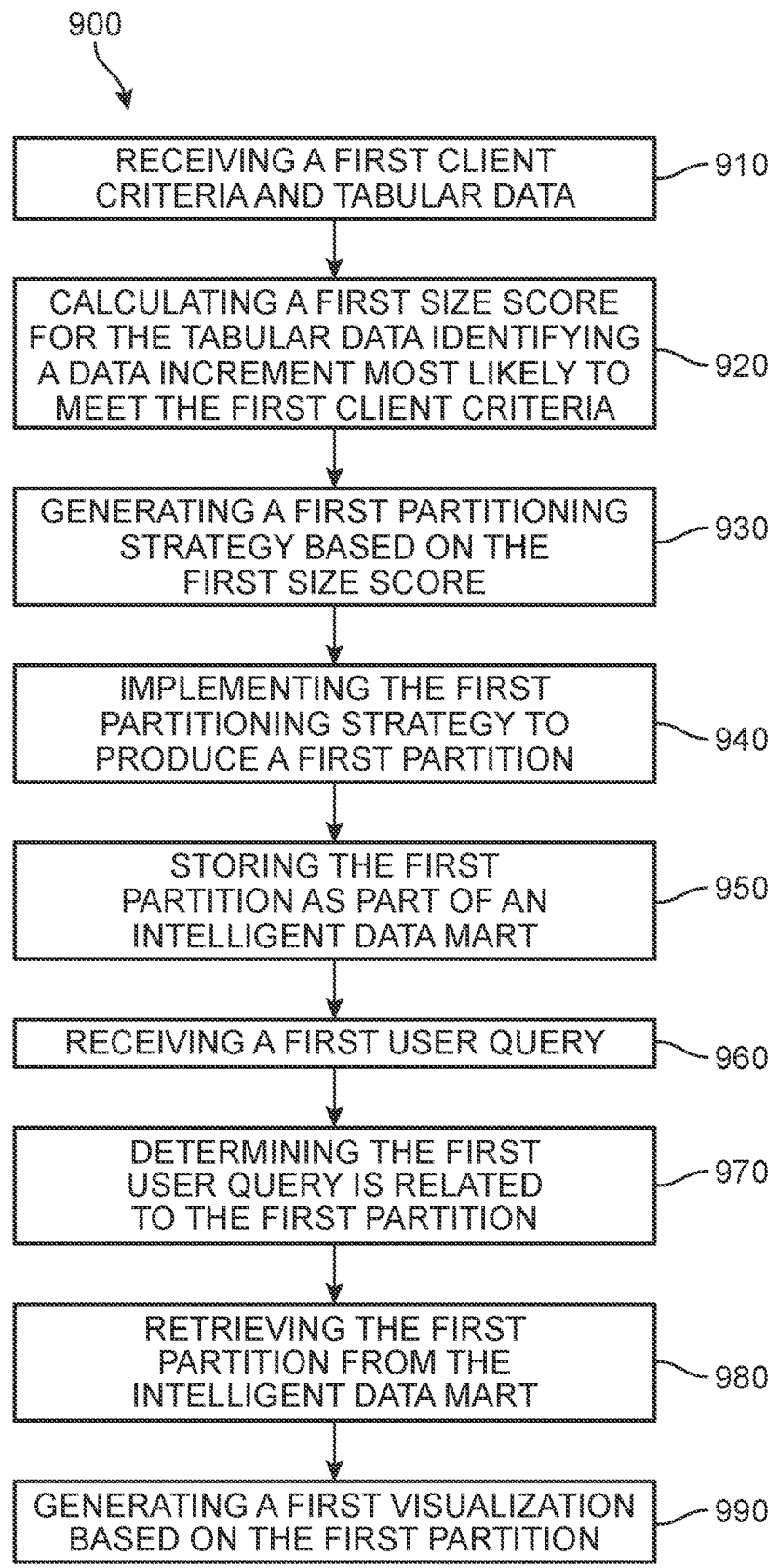
FIG. 9 is a flow chart presenting a method of processing and partitioning data, according to an embodiment.

FIG. 9 is a flow chart illustrating an embodiment of a method 900 of processing and partitioning data for a cloud computing-based infrastructure. The method 900 includes a first step 910 of receiving, at a partitioner module for a data analysis system, a first client criteria and a first client dataset that includes tabular data, and a second step 920 of calculating, at the partitioner module, a first size score for the tabular data, the first size score identifying a first data increment that is most likely to meet the first client criteria. In addition, a third step 930 includes generating, at the partitioner module, a first partitioning strategy based on the first size score, and a fourth step 940 includes implementing, at the data analysis system, the first partitioning strategy to produce sets of aggregated data in the tabular data, the sets including a first partition. A fifth step 950 of the method 900 includes storing the sets of aggregated data as part of an intelligent data mart in the data analysis system. A sixth step 960 includes receiving, via a first user interface associated with a data visualization platform, a first user query, and a seventh step 970 includes determining the first user query is related to the first partition. Furthermore, the method 900 includes an eighth step 980 of retrieving, via the data visualization platform, the first partition from the intelligent data mart, and a ninth step 990 of generating, for the data visualization platform and via a generative artificial intelligence (AI) module, a first visualization based on the first partition.

In other embodiments, the method may include additional steps or aspects. In one example, implementing the first partitioning strategy further includes creating multiple partitions in the tabular data in a substantially synchronous process. In some embodiments, the method also includes steps of receiving a second client criteria indicating a first refresh rate for a first type of data; determining, by reference to the intelligent data mart, that only a first portion of the first partition includes the first type of data; and refreshing, based on the second client criteria, only the first portion of the first partition at the first refresh rate. In another embodiment, the method also includes steps of receiving a third client criteria indicating a second refresh rate for a second type of data that differs from the first refresh rate; determining, by reference to the intelligent data mart, that only a second portion of the first partition includes the second type of data; and refreshing, based on the third client criteria, only the second portion of the first partition at the second refresh rate.

In different embodiments, additional steps can include calculating, at the partitioner module, a second size score for the tabular data, the second size score identifying a second data increment that is also likely to meet the first client criteria; generating, at the partitioner module, a second partitioning strategy based on the second size score; and presenting, via a second user interface for the data analysis system, the first partitioning strategy as a first option and the second partitioning strategy as a second option. In one example, the method also includes receiving, via the second user interface, a selection of the first option, and wherein implementing the first partitioning strategy is in response to receiving the selection of the first option. In another example, the method further includes calculating, at the partitioner module, a second size score for the tabular data, the second size score identifying a second data increment that is less likely to meet the first client criteria than the first data increment; generating, at the partitioner module, a second partitioning strategy based on the second size score; and presenting, via a second user interface for the data analysis system, the second partitioning strategy as a rejected option for review.

For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons/options or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with the user interface, or other such information presentation.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

The methods, devices, and processing described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method for processing and partitioning data for a cloud computing-based infrastructure, the method comprising:
    receiving, at a partitioner module for a data analysis system, a first client criteria and a first client dataset that includes tabular data;
    calculating, at the partitioner module, a first size score for the tabular data, the first size score identifying a first data increment that is most likely to meet the first client criteria;
    generating, at the partitioner module, a first partitioning strategy based on the first size score;
    implementing, at the data analysis system, the first partitioning strategy to produce sets of aggregated data in the tabular data, the sets including a first partition;
    storing the sets of aggregated data as part of an intelligent data mart in the data analysis system;
    receiving, via a first user interface associated with a data visualization platform, a first user query;
    determining the first user query is related to the first partition;
    retrieving, via the data visualization platform, the first partition from the intelligent data mart; and
    generating, for the data visualization platform and via a generative artificial intelligence (AI) module, a first visualization based on the first partition.

2. The method of claim 1, wherein implementing the first partitioning strategy further includes creating multiple partitions in the tabular data in a substantially synchronous process.

3. The method of claim 1, further comprising:
    receiving a second client criteria indicating a first refresh rate for a first type of data;
    determining, by reference to the intelligent data mart, that only a first portion of the first partition includes the first type of data; and
    refreshing, based on the second client criteria, only the first portion of the first partition at the first refresh rate.

4. The method of claim 3, further comprising:
    receiving a third client criteria indicating a second refresh rate for a second type of data that differs from the first refresh rate;
    determining, by reference to the intelligent data mart, that only a second portion of the first partition includes the second type of data; and
    refreshing, based on the third client criteria, only the second portion of the first partition at the second refresh rate.

5. The method of claim 1, further comprising:
    calculating, at the partitioner module, a second size score for the tabular data, the second size score identifying a second data increment that is also likely to meet the first client criteria;
    generating, at the partitioner module, a second partitioning strategy based on the second size score; and
    presenting, via a second user interface for the data analysis system, the first partitioning strategy as a first option and the second partitioning strategy as a second option.

6. The method of claim 5, further comprising receiving, via the second user interface, a selection of the first option, and wherein implementing the first partitioning strategy is in response to receiving the selection of the first option.

7. The method of claim 1, further comprising:
    calculating, at the partitioner module, a second size score for the tabular data, the second size score identifying a second data increment that is less likely to meet the first client criteria than the first data increment;
    generating, at the partitioner module, a second partitioning strategy based on the second size score; and
    presenting, via a second user interface for the data analysis system, the second partitioning strategy as a rejected option for review.

8. A non-transitory computer-readable medium storing software comprising instructions executable by one or more computers which, upon such execution, cause the one or more computers to process and partition data for a cloud computing-based infrastructure by:

receiving, at a partitioner module for a data analysis system, a first client criteria and a first client dataset that includes tabular data;

calculating, at the partitioner module, a first size score for the tabular data, the first size score identifying a first data increment that is most likely to meet the first client criteria;

generating, at the partitioner module, a first partitioning strategy based on the first size score;

implementing, at the data analysis system, the first partitioning strategy to produce sets of aggregated data in the tabular data, the sets including a first partition;

storing the sets of aggregated data as part of an intelligent data mart in the data analysis system;

receiving, via a first user interface associated with a data visualization platform, a first user query;

determining the first user query is related to the first partition;

retrieving, via the data visualization platform, the first partition from the intelligent data mart; and generating, for the data visualization platform and via a generative artificial intelligence (AI) module, a first visualization based on the first partition.

9. The non-transitory computer-readable medium of claim 8, wherein the instructions further cause the one or more computers to create multiple partitions in the tabular data in a substantially synchronous process.

10. The non-transitory computer-readable medium of claim 8, wherein the instructions further cause the one or more computers to:

receive a second client criteria indicating a first refresh rate for a first type of data;

determine, by reference to the intelligent data mart, that only a first portion of the first partition includes the first type of data; and refresh, based on the second client criteria, only the first portion of the first partition at the first refresh rate.

11. The non-transitory computer-readable medium of claim 10, wherein the instructions further cause the one or more computers to:

receive a third client criteria indicating a second refresh rate for a second type of data that differs from the first refresh rate;

determine, by reference to the intelligent data mart, that only a second portion of the first partition includes the second type of data; and refresh, based on the third client criteria, only the second portion of the first partition at the second refresh rate.

12. The non-transitory computer-readable medium of claim 8, wherein the instructions further cause the one or more computers to:

calculate, at the partitioner module, a second size score for the tabular data, the second size score identifying a second data increment that is also likely to meet the first client criteria;

generate, at the partitioner module, a second partitioning strategy based on the second size score; and present, via a second user interface for the data analysis system, the first partitioning strategy as a first option and the second partitioning strategy as a second option.

13. The non-transitory computer-readable medium of claim 12, wherein the instructions further cause the one or more computers to receive, via the second user interface, a selection of the first option, and wherein implementing the first partitioning strategy is in response to receiving the selection of the first option.

14. The non-transitory computer-readable medium of claim 8, wherein the instructions further cause the one or more computers to:

calculate, at the partitioner module, a second size score for the tabular data, the second size score identifying a second data increment that is less likely to meet the first client criteria than the first data increment;

generate, at the partitioner module, a second partitioning strategy based on the second size score; and present, via a second user interface for the data analysis system, the second partitioning strategy as a rejected option for review.

15. A system for processing and partitioning data for a cloud computing-based infrastructure comprising one or more computers and one or more storage devices storing instructions that are operable, when executed by the one or more computers, to cause the one or more computers to:

receive, at a partitioner module for a data analysis system, a first client criteria and a first client dataset that includes tabular data;

calculate, at the partitioner module, a first size score for the tabular data, the first size score identifying a first data increment that is most likely to meet the first client criteria;

generate, at the partitioner module, a first partitioning strategy based on the first size score;

implement, at the data analysis system, the first partitioning strategy to produce sets of aggregated data in the tabular data, the sets including a first partition;

store the sets of aggregated data as part of an intelligent data mart in the data analysis system;

receive, via a first user interface associated with a data visualization platform, a first user query;

determine the first user query is related to the first partition;

retrieve, via the data visualization platform, the first partition from the intelligent data mart; and generate, for the data visualization platform and via a generative artificial intelligence (AI) module, a first visualization based on the first partition.

16. The system of claim 15, wherein the instructions further cause the one or more computers to create multiple partitions in the tabular data in a substantially synchronous process.

17. The system of claim 15, wherein the instructions further cause the one or more computers to:

receive a second client criteria indicating a first refresh rate for a first type of data;

determine, by reference to the intelligent data mart, that only a first portion of the first partition includes the first type of data; and refresh, based on the second client criteria, only the first portion of the first partition at the first refresh rate.

18. The system of claim 17, wherein the instructions further cause the one or more computers to:

receive a third client criteria indicating a second refresh rate for a second type of data that differs from the first refresh rate;

determine, by reference to the intelligent data mart, that only a second portion of the first partition includes the second type of data; and refresh, based on the third client criteria, only the second portion of the first partition at the second refresh rate.

19. The system of claim 15, wherein the instructions further cause the one or more computers to:

calculate, at the partitioner module, a second size score for the tabular data, the second size score identifying a second data increment that is also likely to meet the first client criteria;

generate, at the partitioner module, a second partitioning strategy based on the second size score; and present, via a second user interface for the data analysis system, the first partitioning strategy as a first option and the second partitioning strategy as a second option.

20. The system of claim 19, wherein the instructions further cause the one or more computers to receive, via the second user interface, a selection of the first option, and wherein implementing the first partitioning strategy is in response to receiving the selection of the first option.

\* \* \* \* \*